United States Patent
Gopalan et al.

(10) Patent No.: US 11,489,624 B2
(45) Date of Patent: Nov. 1, 2022

(54) ERROR CORRECTION IN NETWORK PACKETS USING LOOKUP TABLES

(71) Applicant: Aira Technologies, Inc., Saratoga, CA (US)

(72) Inventors: RaviKiran Gopalan, Cupertino, CA (US); Anand Chandrasekher, Saratoga, CA (US); Yihan Jiang, Cupertino, CA (US); Arman Rahimzamani, San Jose, CA (US)

(73) Assignee: Aira Technologies, Inc., Saratoga, CA (US)

( * ) Notice: Subject to any disclaimer, the term of this patent is extended or adjusted under 35 U.S.C. 154(b) by 0 days.

(21) Appl. No.: 17/688,718

(22) Filed: Mar. 7, 2022

(65) Prior Publication Data
US 2022/0294561 A1    Sep. 15, 2022

Related U.S. Application Data (60) Provisional application No. 63/158,817, filed on Mar. 9, 2021.

(51) Int. Cl.
*H04L 1/00* (2006.01)
*H04L 1/18* (2006.01)

(52) U.S. Cl.
CPC .......... *H04L 1/0061* (2013.01); *H04L 1/0084* (2013.01); *H04L 1/18* (2013.01)

(58) Field of Classification Search
CPC ... H04L 1/0041; H04L 1/0045; H04L 1/0061; H04L 1/0084; H04L 1/18; H03M 13/47; H03M 13/6577; H03M 13/6306; H03M 13/09
See application file for complete search history.

(56) References Cited

U.S. PATENT DOCUMENTS

| | | | |
|---|---|---|---|
| 5,657,325 A | 8/1997 | Lou | |
| 5,910,182 A | 6/1999 | Dent et al. | |
| 5,968,197 A | 10/1999 | Doiron | |
| 6,418,549 B1 | 7/2002 | Ramchandran | |

(Continued)

FOREIGN PATENT DOCUMENTS

| CN | 106487610 A | 3/2017 |
|---|---|---|
| GB | 2493081 A | 1/2013 |

OTHER PUBLICATIONS

Kim et al., "Deepcode: Feedback Codes via Deep Learning," [online] Jul. 2, 2018 [retrieved on Apr. 17, 2020], Retrieved from the Internet: < URL:https://arxiv.org/abs/1807.00801v1>, 24 pages.

(Continued)

*Primary Examiner* — Shelly A Chase
(74) *Attorney, Agent, or Firm* — Carr & Ferrell LLP (57) ABSTRACT

Error correction in network packets using lookup tables are disclosed herein. The method can include extracting soft information from copies of a network packet, using the soft information to select positions in a payload of the network packet with uncertain values of bits, changing values at the positions to a combination of values to obtain a modified payload of the network packet, and calculating the CRC for the modified payload. When the modified payload matches an error detection code in the network packet, errors in the payload are corrected.

8 Claims, 10 Drawing Sheets

(56) References Cited

U.S. PATENT DOCUMENTS

| | | |
|---|---|---|
| 6,505,253 B1 | 1/2003 | Chiu |
| 6,523,068 B1 | 2/2003 | Beser et al. |
| 7,016,658 B2 | 3/2006 | Kim et al. |
| 7,124,205 B2 | 10/2006 | Craft et al. |
| 7,447,234 B2 | 11/2008 | Colas et al. |
| 7,664,883 B2 | 2/2010 | Craft et al. |
| 7,848,350 B1 | 12/2010 | Inamdar |
| 7,971,131 B1 | 6/2011 | Ordentilch |
| 8,223,643 B1 | 7/2012 | Wolfgang |
| 8,305,963 B1 | 11/2012 | Breau |
| 8,327,232 B2 | 12/2012 | Budampati et al. |
| 8,352,830 B2 | 1/2013 | Landschaft et al. |
| 8,437,267 B2 | 5/2013 | Amir et al. |
| 8,473,821 B2 | 6/2013 | Taghavi Nasrabadi et al. |
| 8,693,406 B2 | 4/2014 | Ahmadi |
| 8,990,663 B2 | 3/2015 | Liu et al. |
| 10,270,564 B2 | 4/2019 | Djukic et al. |
| 10,491,569 B1 | 11/2019 | Powell |
| 10,749,594 B1 | 8/2020 | O'Shea et al. |
| 11,088,784 B1 | 8/2021 | Gopalan et al. |
| 11,191,049 B1 | 11/2021 | Chandrasekher et al. |
| 11,368,250 B1 | 6/2022 | Chandrasekher et al. |
| 11,368,251 B1 | 6/2022 | Chandrasekher et al. |
| 2001/0030954 A1 | 10/2001 | Hameleers |
| 2002/0026523 A1 | 2/2002 | Mallory et al. |
| 2002/0054608 A1 | 5/2002 | Wan |
| 2002/0122510 A1 | 9/2002 | Yakhnich et al. |
| 2003/0215029 A1 | 11/2003 | Limberg |
| 2004/0170120 A1 | 9/2004 | Reunamaki et al. |
| 2005/0094561 A1 | 5/2005 | Raaf |
| 2005/0208897 A1 | 9/2005 | Lyons |
| 2006/0021040 A1 | 1/2006 | Boulanger |
| 2006/0047862 A1 | 3/2006 | Shearer et al. |
| 2006/0268996 A1 | 11/2006 | Sethi et al. |
| 2007/0168197 A1 | 7/2007 | Vasilache |
| 2008/0002688 A1 | 1/2008 | Kim et al. |
| 2008/0002790 A1 | 1/2008 | Itoh |
| 2008/0126824 A1 | 5/2008 | Lee et al. |
| 2008/0225735 A1 | 9/2008 | Qiu |
| 2008/0250299 A1 | 10/2008 | Maillet et al. |
| 2009/0086711 A1 | 4/2009 | Capretta et al. |
| 2009/0119566 A1 | 5/2009 | Hiromitsu |
| 2009/0125779 A1* | 5/2009 | Vermeiden ............ H04L 1/0061 |
| | | 714/E11.053 |
| 2009/0276686 A1 | 11/2009 | Liu et al. |
| 2010/0037270 A1 | 2/2010 | Bennett |
| 2010/0165868 A1 | 7/2010 | Gersemsky |
| 2010/0192175 A1 | 7/2010 | Bachet |
| 2010/0202416 A1 | 8/2010 | Wilhelmsson et al. |
| 2010/0262885 A1 | 10/2010 | Cheng |
| 2011/0131461 A1 | 6/2011 | Schulz |
| 2011/0206019 A1 | 8/2011 | Zhai et al. |
| 2011/0206065 A1 | 8/2011 | Kim et al. |
| 2011/0216787 A1 | 9/2011 | Ai et al. |
| 2012/0300642 A1 | 11/2012 | Abel et al. |
| 2013/0018889 A1 | 1/2013 | Jagmohan |
| 2013/0132786 A1 | 5/2013 | Tanigawa et al. |
| 2013/0198591 A1* | 8/2013 | Kamuf ............ H03M 13/6577 |
| | | 714/780 |
| 2013/0223203 A1 | 8/2013 | Bai |
| 2013/0250179 A1 | 9/2013 | Lida |
| 2013/0339036 A1 | 12/2013 | Baeckstroem et al. |
| 2014/0140342 A1 | 5/2014 | Narad |
| 2014/0241309 A1 | 8/2014 | Hilton et al. |
| 2015/0009902 A1 | 1/2015 | Emmanuel |
| 2016/0006842 A1 | 1/2016 | Tahir |
| 2016/0062954 A1 | 3/2016 | Ruff |
| 2016/0254881 A1 | 9/2016 | Meylan |
| 2016/0261375 A1 | 9/2016 | Roethig et al. |
| 2017/0006616 A1 | 1/2017 | Singh et al. |
| 2017/0012799 A1 | 1/2017 | Jiang et al. |
| 2017/0269876 A1 | 9/2017 | Mukhopadhyay et al. |
| 2018/0013808 A1 | 1/2018 | Petry et al. |
| 2018/0048567 A1 | 2/2018 | Ignatchenko |
| 2018/0101957 A1 | 4/2018 | Talathi |
| 2018/0267850 A1 | 9/2018 | Froelich et al. |
| 2018/0288198 A1 | 10/2018 | Pope et al. |
| 2018/0314985 A1 | 11/2018 | O'Shea |
| 2018/0359811 A1 | 12/2018 | Verzun et al. |
| 2019/0028237 A1 | 1/2019 | Pan et al. |
| 2019/0037052 A1 | 1/2019 | Deshpande |
| 2019/0097680 A1 | 3/2019 | O'Brien |
| 2019/0097914 A1 | 3/2019 | Zhong et al. |
| 2019/0392266 A1 | 12/2019 | Zhong et al. |
| 2019/0393903 A1 | 12/2019 | Mandt et al. |
| 2020/0099470 A1* | 3/2020 | Licardie ............... H03M 13/47 |
| 2020/0128279 A1 | 4/2020 | Han et al. |
| 2020/0177418 A1 | 6/2020 | Hoydis et al. |
| 2020/0213152 A1 | 7/2020 | Choquette et al. |
| 2020/0320371 A1 | 10/2020 | Baker |
| 2020/0383169 A1 | 12/2020 | Takahashi et al. |
| 2021/0014939 A1 | 1/2021 | Verzun et al. |
| 2021/0034846 A1 | 2/2021 | Ko et al. |
| 2021/0056058 A1 | 2/2021 | Lee et al. |
| 2021/0120440 A1 | 4/2021 | Reimann et al. |
| 2021/0319286 A1 | 10/2021 | Gunduz |
| 2021/0392033 A1 | 12/2021 | Haartsen |
| 2022/0045696 A1 | 2/2022 | Boussard |
| 2022/0114436 A1 | 4/2022 | Gopalan et al. |
| 2022/0209893 A1 | 6/2022 | Chandrasekher et al. |
| 2022/0209894 A1 | 6/2022 | Chandrasekher et al. |
| 2022/0209895 A1 | 6/2022 | Chandrasekher et al. |
| 2022/0209896 A1 | 6/2022 | Gopalan et al. |
| 2022/0209897 A1 | 6/2022 | Jiang et al. |
| 2022/0209909 A1 | 6/2022 | Chandrasekher et al. |
| 2022/0210250 A1 | 6/2022 | Chandrasekher et al. |

OTHER PUBLICATIONS

Gopalan et al., "Systems and Methods for Artificial Intelligence Discovered Codes", U.S. Appl. No. 17/069,794, filed Oct. 13, 2020, Specification, Claims, Abstract, and Drawings, 43 pages.

Goutay et al., "Deep reinforcement learning autoencoder with noisy feedback." 2019 International Symposium on Modeling and Optimization in Mobile, Ad Hoc, and Wireless Networks (WiOPT). IEEE, Jun. 24, 2019, 6 pages.

Yamamoto et al., "Application of Yamamoto-Itoh coding scheme to discrete memoryless broadcast channels," 2017 IEEE International Symposium on Information Theory (ISIT). IEEE, 2017, 5 pages.

Aoudia et al., "End-to-end learning of commununications systems without a channel model." 2018 52nd Asilornar Conference on Signals, Systems, and Computers. IEEE, Dec. 5, 2018, 6 pages.

Duman et al., "On optimal power allocation for turbo codes." Proceedings of IEEE International Symposium on Information Theory. IEEE, Jun. 29-Jul. 4, 1997, 1 page.

Arvinte et al., "Deep log-likelihood ratio quantization." 2019 27th European Signal Processing Conference (EUSIPCO). IEEE, 2019, 5 pages.

"International Search Report"and "Written Opinion", Patent Cooperation Treaty Application No. PCT/US2021/054265, dated Nov. 24, 2021, 24 pages.

"International Search Report" and "Written Opinion", Patent Cooperation Treaty Application No. PCT/US2021/0063356, dated Jan. 14, 2022, 9 pages.

"international Search Report" and "Written Opinion", Patent Cooperation Treaty Application No. PCT/US2021/061902, dated Jan. 24, 2022, 11 pages.

Henze, Martin, "A Machine-Learning Packet-Classification Tool for Processing Corrupted Packets on End Hosts", Diploma Thesis, Chair of Communication and Distributed Systems, RWTH Aachen University, Mar. 2011, 103 pages.

"International Search Report" and "Written Opinion", Patent Cooperation Treaty Application No. PCT/US2021/06617, dated Mar. 11, 2022, 12 pages.

Kötter et al., "Coding for Errors and Erasures in Random Network Coding", IEEE Transactions on Information Theory 54.8; 3579-3591. Mar. 25, 2008; Retrieved on Feb. 19, 2022 (Feb. 19, 2022) from <https://arxiv.org/pdf/cs/0703061.pdf> entire document; 30 pages.

(56) References Cited

OTHER PUBLICATIONS

Grcar, Joseph, "How ordinary elimination became Gaussian elimination", Historia Mathematica vol. 38 Issue 2, May 2011; Available online Sep. 28, 2010; pp. 163-218.
"International Search Report" and "Written Opinion", Patent Cooperation Treaty Application No. PCT/US2021/064735, dated Mar. 17, 2022, 11 pages.
"International Search Report" and "Written Opinion", Patent Cooperation Treaty Application No. PCT/US2021/065003, dated Mar. 22, 2022, 10 pages.

* cited by examiner

ERROR CORRECTION IN NETWORK PACKETS USING LOOKUP TABLES

CROSS REFERENCE(S)

This application claims the benefit and priority of U.S. Provisional Application Ser. No. 63/158,817, filed on Mar. 9, 2021, which is hereby incorporated by reference herein in its entirety.

TECHNICAL FIELD

The present disclosure relates generally data processing, and more specifically to error correction in network packets.

BACKGROUND

Neural networks can be used to estimate positions of unreliable bits in a network packet based on corrupted copies of the network packet. However, neural networks may have computational complexities higher than desirable for practical applications. Thus, estimating positions of unreliable bits in the network packet can require optimizing a neural network for that specific purpose.

SUMMARY

One or more embodiments of the present disclosure may comprise a method including receiving copies of a network packet; extracting soft information from the copies of the network packet; using the soft information to select K positions in a payload of the network packet with uncertain values of bits; selecting the K positions having largest levels of uncertainty; changing the uncertain values at the K positions to a selected combination of values to obtain a modified payload of the network packet; and calculating an error detection code for the modified payload, wherein when the modified payload matches an error detection code in the network packet, errors in the payload are corrected.

One or more embodiments of the present disclosure may comprise a system having a processor; and a memory for storing instructions, the processor executing the instructions to: receive copies of a network packet; extract soft information from the copies of the network packet; use the soft information to select K positions in a payload of the network packet with uncertain values of bits; select the K positions having largest levels of uncertainty; change the uncertain values at the K positions to selected combination of values to obtain a modified payload of the network packet; and calculate an error detection code for the modified payload, wherein when the modified payload matches an error detection code in the network packet, errors in the payload are corrected.

One or more embodiments of the present disclosure may comprise a method including extracting soft information from copies of a network packet; using the soft information to select positions in a payload of the network packet with uncertain values of bits; changing values at the positions to a combination of values to obtain a modified payload of the network packet; and calculating an error detection code for the modified payload, wherein when the modified payload matches an error detection code in the network packet, errors in the payload are corrected.

One or more embodiments of the present disclosure may comprise a method including receiving a sequence of corrupted copies of a network packet; forming an input table having the corrupted copies of the network packet as columns and values of bits at the same positions in the corrupted copies as rows; determining, based on at least one lookup table and based on values of bits in the rows of the input table, logit values corresponding to the rows of input table; and determining, based on the logit values, values of bits in the network packet.

BRIEF DESCRIPTION OF THE DRAWINGS

Embodiments are illustrated by way of example and not limitation in the figures of the accompanying drawings, in which like references indicate similar elements.

DETAILED DESCRIPTION

Figure 1:
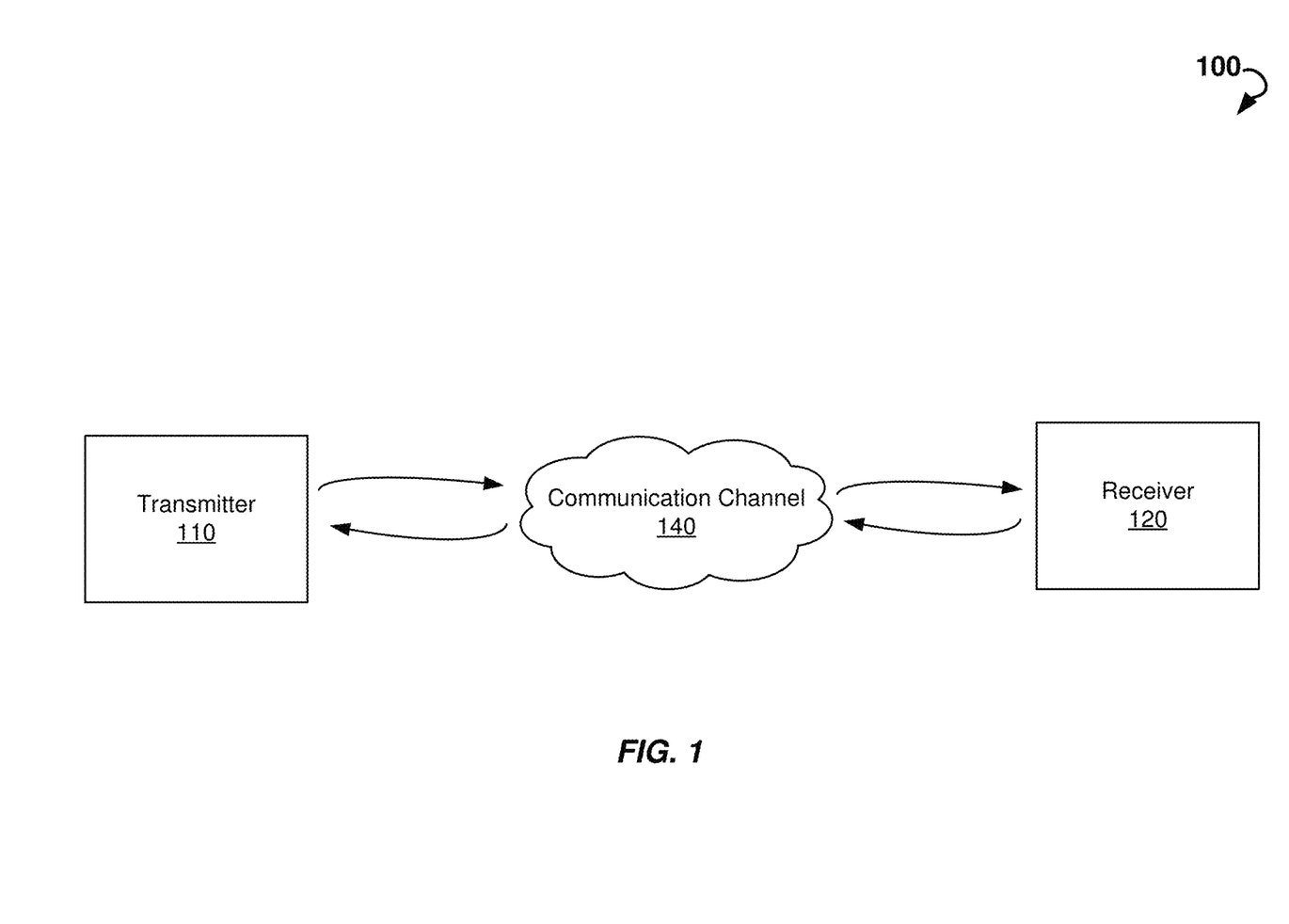
FIG. 1 is a block diagram of an environment, in which systems and methods for error correction in network packets can be implemented, according to some example embodiments.

Referring now to the drawings, FIG. 1 is a block diagram of environment 100, in which systems and methods for error correction in network packets can be implemented, according to some example embodiments.

The environment 100 may include a transmitter 110, a receiver 120, and a communication channel 140. The transmitter 110 may send network packets over the communication channel 140. The receiver 120 may receive the network packets and analyze the integrity of the network packets. If the receiver 120 determines that a network packet is corrupted, then the receiver 120 may request that the transmitter 110 retransmit the network packet.

In various embodiments, the transmitter 110 or receiver 120 may include a computer (e.g., laptop computer, tablet computer, desktop computer), a server, a cellular phone, a smart phone, a gaming console, a multimedia system, a smart television device, wireless headphones, set-top box, an infotainment system, in-vehicle computing device, informational kiosk, smart home computer, software application, computer operating system, a modem, a router, and so forth.

The communication channel 140 may include the Internet or any other network capable of communicating data between devices. Suitable networks may include or interface with any one or more of, for instance, a local intranet, a corporate data network, a data center network, a home data network, a Personal Area Network, a Local Area Network (LAN), a Wide Area Network (WAN), a Metropolitan Area Network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or a Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The communication channel 140 can further include or interface with any one or more of a Recommended Standard 232 (RS-232) serial connection, an IEEE-1394 (FireWire) connection, a Fiber Channel connection, an IrDA (infrared) port, a Small Computer Systems Interface connection, a Universal Serial Bus (USB) connection or other wired or wireless, digital or analog interface or connection, mesh or Digi® networking.

Figure 2:
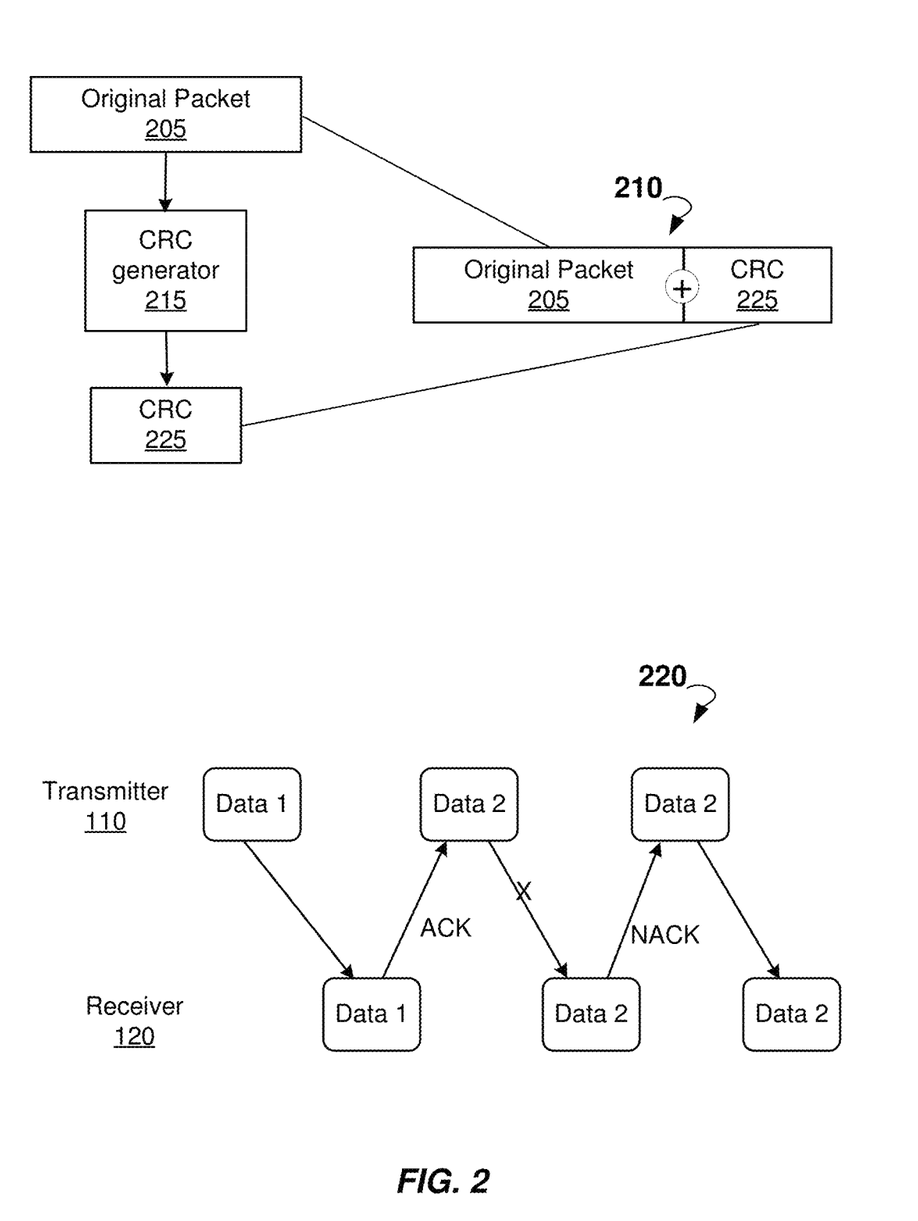
FIG. 2 is a block diagram showing an example network packet and an automatic repeat request (ARQ) method for data transmission, according to some example embodiments of the present disclosure.

FIG. 2 is a block diagram showing an example network packet 210 and an automatic repeat request (ARQ) method 220 for data transmission. Transmitter 110 may send, via communication channel 140, a network packet including a binary message $x \in \{0,1\}^n$. The receiver 120 may receive a binary message $y \in \{0,1\}^n$, which is the message x corrupted by the communication channel 140. Typically, the message is corrupted due to the noise in communication channels, which is the main cause of packet loss. The packet loss results in inefficiencies, such as reduced throughput of the transmitted data, degraded audio quality, and so forth. Typically, communication schemes such as cyclic redundancy check (CRC) and the ARQ are used to mitigate packet loss.

CRC 225 is an error-detecting code used to determine whether a network packet is corrupted. CRC 225 is generated by CRC generator 215 based on an original packet 205 (a payload) and added to the original packet 205 (a payload) to form the network packet 210. The network packet 210 is transmitted from the transmitter 110 to receiver 120 via the communication channel 140. CRC 225 is typically 3 bytes regardless of the length of the payload. When the network packet with CRC 225 is received, the receiver 120 computes the new CRC from the received payload of the network packet and compares the new CRC to the appended CRC 225. If the appended CRC 225 mismatches the new CRC computed from the received payload, the network packet 210 is corrupted.

The ARQ is a communication method in which if the network packet 210 is determined to be corrupted, the receiver 120 requests the transmitter 110 to retransmit the network packet 210. The ARQ stops when the network packet 210 is received correctly or the maximum timeout is reached. Typically, ARQ discards previously received network packets, and thus, the information from the previously received packets is not used.

ARQ+CRC is an approach widely used in Bluetooth™, Wi-Fi™ and 3G/4G/LTE/5G networks. However, ARQ+CRC may not be efficient because even if only one bit in the received network packet is erroneous (resulting in a CRC check failure), the whole network packet must be retransmitted. Thus, the Block Error Rate (BLER) of ARQ+CRC scheme can be higher than required.

Prior to requesting retransmission of the network packet, the receiver 120 can modify a few bits in the payload and test the CRC again. Given a payload of length L, and assuming that only one bit in the payload is erroneous, modifying all possible 1-bits in the payload requires checking CRC L times. However, very often due to the nature of communication systems, there will be more than 1 bit error. Flipping all possible bits requires $2^L$ CRC checks. This is computationally infeasible and can drastically reduce the validity of the CRC.

Hence, to reduce the number of all possible bit flips, one can think about extracting soft information to determine which bits in the payload are the most unreliable (uncertain). Some embodiments of the present disclosure may provide a method for modifying the unreliable bits to test the CRC, without drastically reducing the validity of the CRC.

Figure 3:
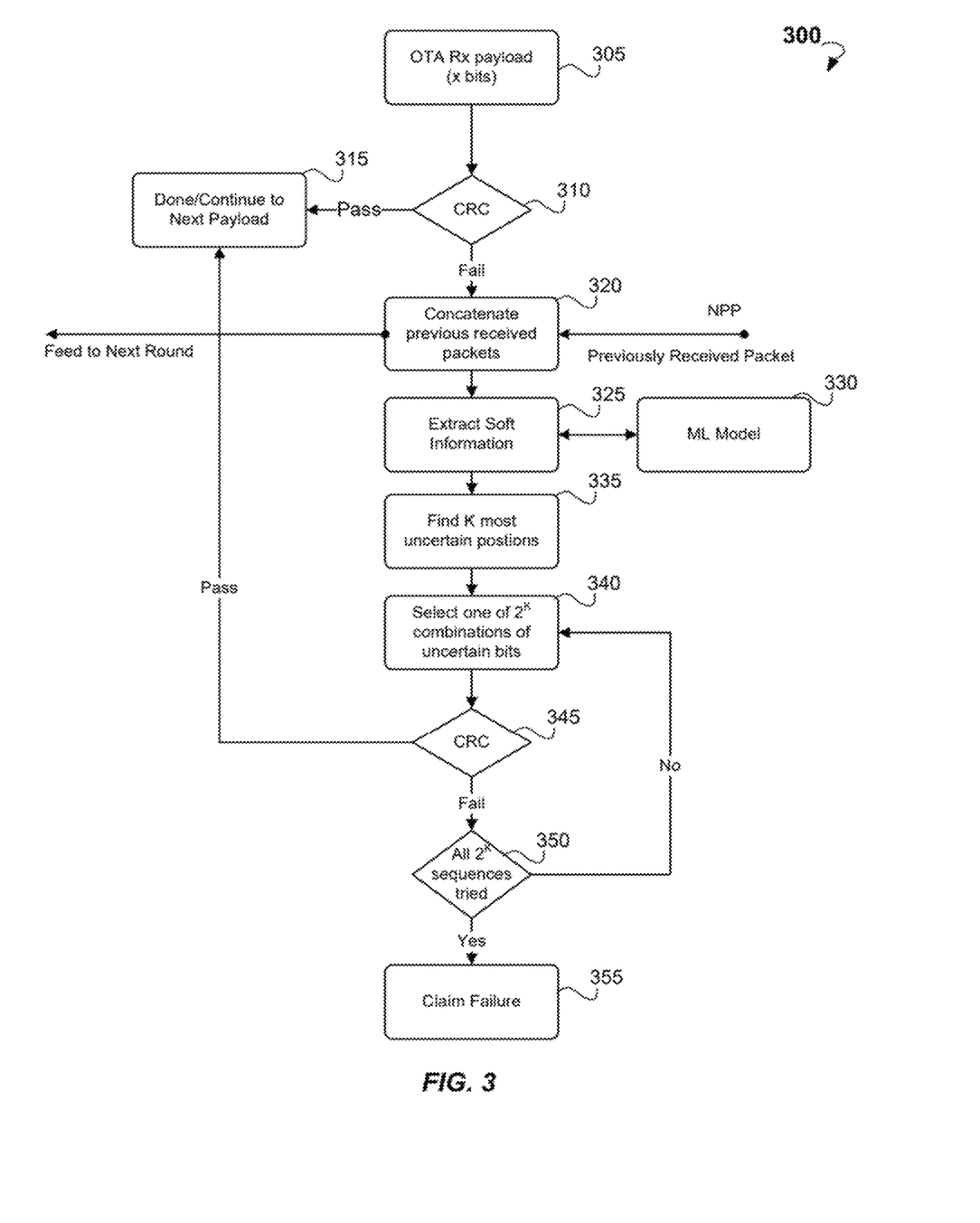
FIG. 3 is a flow chart of the overall NPP method that includes a method for error correction in network packets, according to various example embodiments of the present disclosure.

FIG. 3 is a flow chart of method 300 for an error correction in network packets. The method 300 is also referred to as a neural packet processor (NPP) method 300. The method 300 can be performed by receiver 120 in environment 100 as shown in FIG. 1. The NPP method 300 includes ARQ, CRC, and soft information processing. In general, the NPP method 300 includes the following: (1) checking the CRC of received network packet, and if CRC fails then (2) using previously received network packets to extract soft information to propose multiple alternative sequences of bits and to check the CRC again.

The NPP method 300 may commence in block 305 with receiving a network packet having a payload of x bits and the CRC. In decision block 310, the NPP method 300 may calculate CRC for the received payload and compare the calculated CRC with received CRC. If CRC check passes, then the NPP method 300 may proceed, in block 315, with processing the next network packet.

If CRC check fails, then the NPP method 300 may proceed, in block 320, with concatenating the network packet with previously received copies of the network packet. The current copy of the network packet can be stored in a memory for use in the next round (attempt) of receiving and processing a copy of the network packet.

In block 325, the NPP method 300 may extract soft information from the copies of the network packet. In some embodiments, the soft information may include expected values for bits in positions of payload of the network packet. For example, the expected values can be real numbers from 0 to 1. An expected value for a position j can be obtained by a machine learning (ML) model 330 based on values of bits at position j in all the copies of the network packet and values of bits in positions neighboring to j in all the copies of the network packet (due to the correlation caused by real world channel and modulations). Therefore, the ML model 330 determines the uncertainty level according to logit value $p/(1-p)$.

In block 335, the NPP method 300 may include using the soft information to select K positions in the payload with most uncertain values of bits. For example, the NPP method 300 may include determining levels of uncertainty for positions of bits in the payload. A level of uncertainty for a position j can be found as minimum between a distance of an expected value at the position j from 0 and a distance of the expected value at the position j from 1. The NPP method 300 may select positions having K largest levels of uncertainty.

In block 340, the NPP method 300 may proceed with selecting a combination of values of K bits from $2^K$ possible combinations of values of bits at the selected K positions. The NPP method 300 may change the values at the selected K positions to the selected combination of values to obtain a modified payload of the network packet.

In block 345, the NPP method 300 may proceed with calculating the CRC for the modified payload. If the CRC of the modified payload matches the CRC in the received network packet, errors in the payload are corrected and the NPP method 300 may process the next network packet in block 315.

If the CRC of the modified payload does not match the CRC in the received network packet, the NPP method 300 may proceed, in block 350, with checking whether all possible combinations of values of K bits have been selected and tested. If not all the possible combinations have been tested, the NPP method 300 may proceed, in block 340, with selecting the next combination.

If all possible combinations have been selected and tested, then the NPP method 300 may proceed, in block 355, with the determination that the network packet cannot be corrected. In this case, the NPP method 300 may request that the network packet be retransmitted. Note that since CRC has a linear structure, which could be further optimized to improve the runtime performance via another filed patent (9865US).

If all possible combinations have been selected and tested, then the NPP method 300 may proceed, in block 355, with the determination that the network packet cannot be corrected. In this case, the NPP method 300 may request that the network packet be retransmitted.

Figure 4:
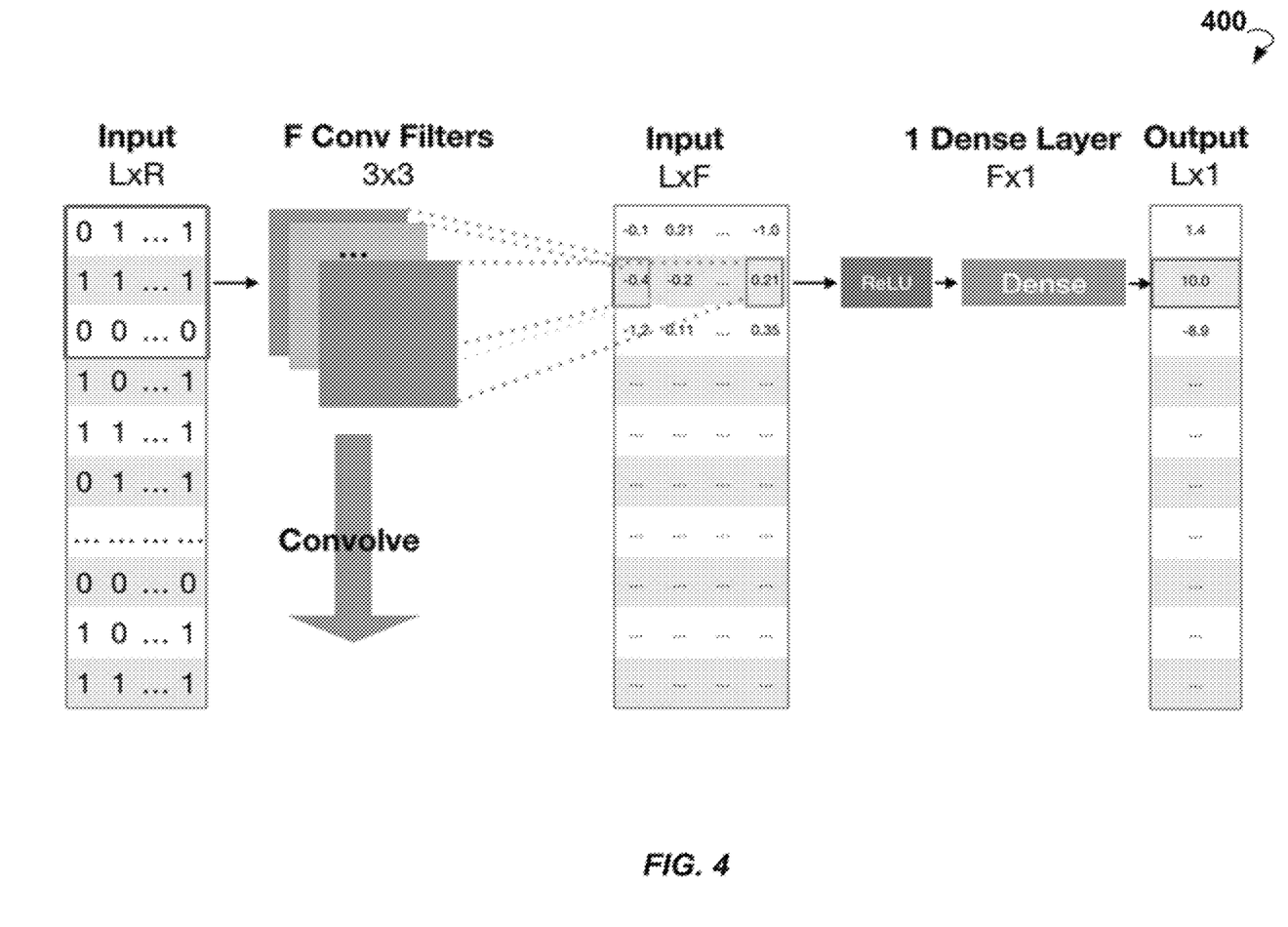
FIG. 4 is a schematic diagram illustrating an NPP machine learning model, according to an example embodiment.

The ML model to extract soft information is a deep learning convolutional neural network (CNN) with 1-dimension inputs, as shown in FIG. 4. FIG. 4 is a schematic diagram 400 illustrating an NPP ML model (also referred to as a ML model), according to an example embodiment. The ML model is composed of one layer of CNN with 100 filters, and one dense layer. As shown in FIG. 4, the number of rounds is R, a block length is L in bits, a CNN filter size is F, and a kernel size is 3. The output is an uncertainty logit, which means that the more the value is larger than 0, the higher is the likelihood that this value can decode 1, and vice versa.

Although the ML model is simple, direct running of this ML model, for example, on a central processing unit (CPU) of a personal computer, may require over 200 ms runtime latency, and over 450 KB memory. This latency may be problematic for deploying deep learning models to any edge devices, especially Internet of things (IoT) devices like Bluetooth microcontrollers.

Currently used TinyML research, such as quantization, pruning, and model distillation, are still in their early stages, and are designed to be general purpose TinyML techniques. The computational cost of applying the current conventional interpreter-based framework (such as TF Lite Micro) is still beyond what can be allocated for microcontrollers, as shown in Table 1.

TABLE 1

Runtime and memory footprint.

|  | Number of Parameters | Runtime for 1 packet | Model Size |
|---|---|---|---|
| NPP TF Full | 7209 | 200 ms (on Intel Core i7-9750 H CPU @ 2.60 GHz) | 450 KB |
| NPP TF Lite Micro | 3410 | 10 ms (on Nordic Devkit with 64 MHz ARM Cortex M4 Processor) | 18 KB |
| BT Requirement |  | <1 ms | <10 KB |

To satisfy Bluetooth microcontroller requirements, the systems and methods of the present disclosure utilize special properties of the NPP. Due to the very special properties of digital communication systems, multiple implementations of the Bluetooth microcontroller can be provided. The NPP soft information extraction is a simple and small CNN model, which only contains Conv1D and Dense layers. TF Lite Micro has multiple optimizations for other layers, which is not useful for the NPP. Thus, building an optimized implementation of the NPP using the systems and methods of the present disclosure can reduce the framework overhead of TF Micro by a large margin.

Moreover, the input space of the NPP is limited as the received sequence only contains binary values, and the convolutional window has a limited kernel size, which can potentially use memory-runtime tradeoff, through hashing, to improve the runtime efficiency.

Compared to the implementation of the NPP via common TinyML frameworks, like TF Lite Micro, in the conventional systems, the present disclosure provides methods developed specifically for the NPP, which can lead to a very low latency and memory footprint.

With respect to the size and the possible combinations of the input for NPP, the CNN has kernel size 3, with the number of rounds R, which means that for each output value, it only depends on the input of size 3R. Because the filter of the CNN filter is constant across all positions, the input space is restricted. Moreover, Bluetooth communication only takes binary inputs, which makes enumeration of all possible inputs possible. For two rounds, there are in total $2^6=64$ possible inputs, and for three rounds, there are in total $2^9=512$ possible inputs.

Figure 5:
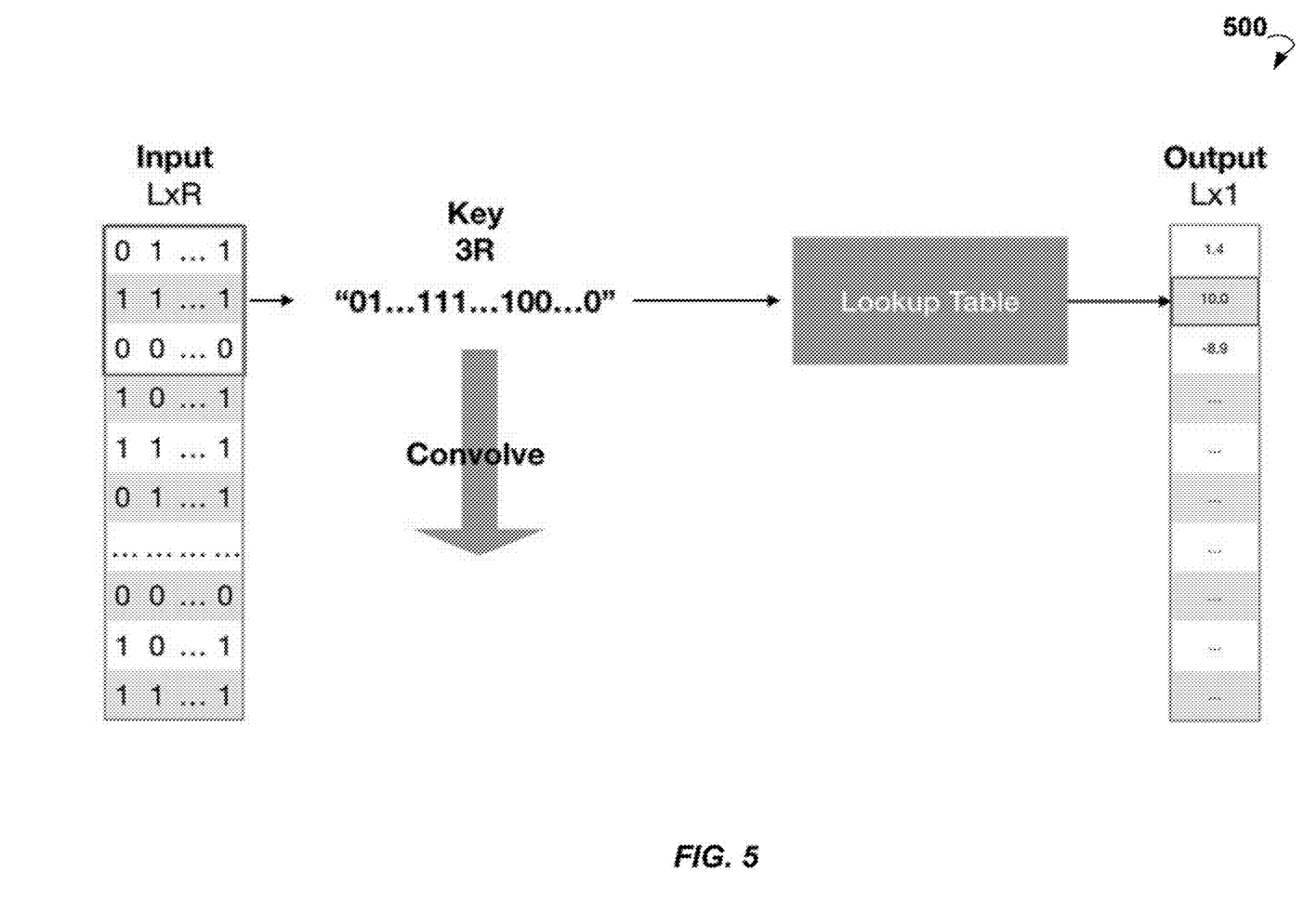
FIG. 5 is a schematic diagram showing a lookup table, according to an example embodiment.

FIG. 5 is a schematic diagram 500 showing an NPP lookup table, according to an example embodiment. Implementing a convolution by a lookup table reduces the computation from a 2-layer neural network to O(1), which drastically reduces the computational complexity. Moreover, since the size of the lookup table is not very large for round 2 and 3 (It's 64 Bytes for the 2-round table, and 512 Bytes for the 3-round look-up table), this technique makes it possible to deploy the NPP to microcontrollers.

Figure 6:
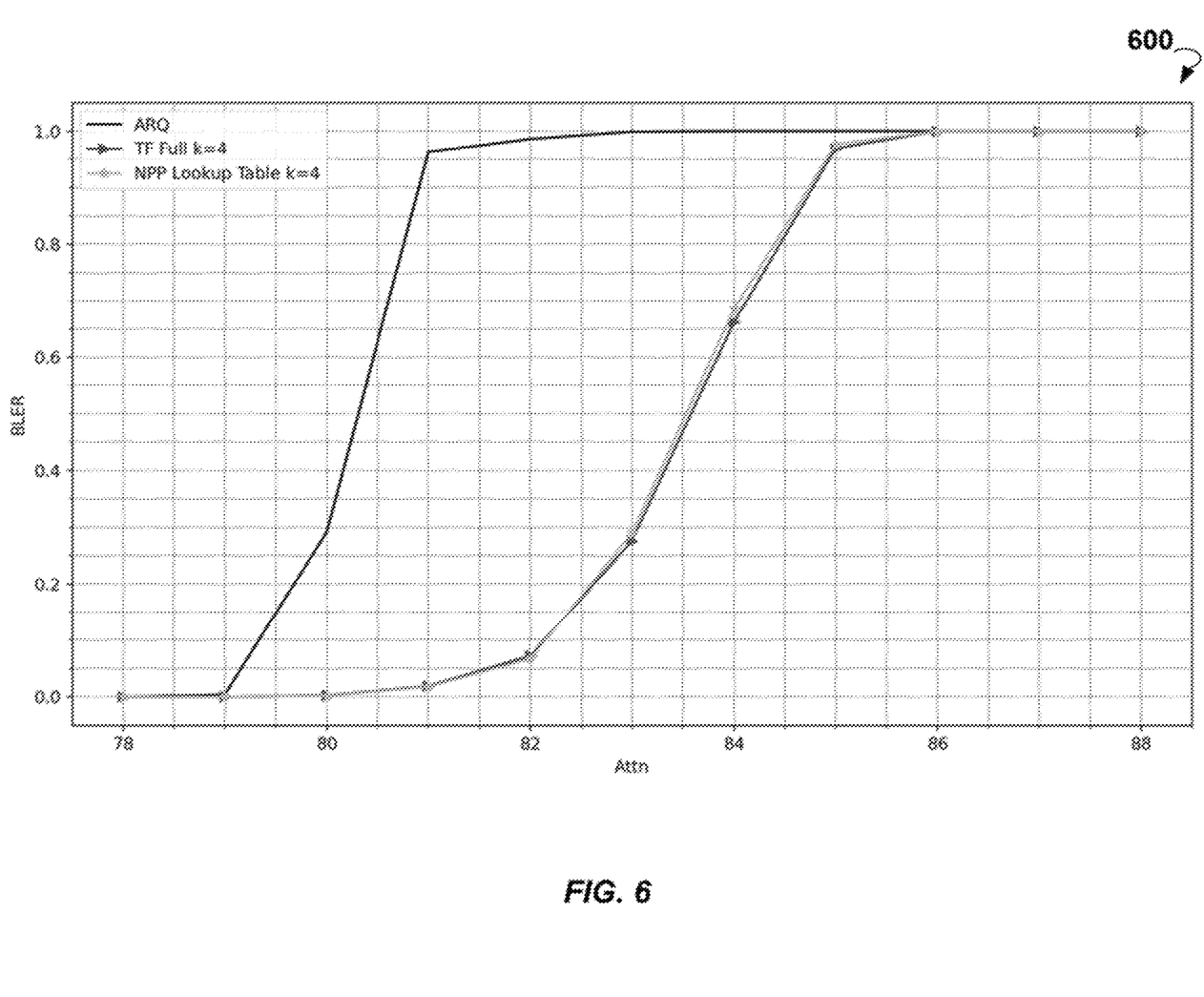
FIG. 6 is a diagram showing performance of a lookup table for three rounds, according to an example embodiment.

FIG. 6 is a diagram 600 showing performance of the lookup table for three rounds. As shown in FIG. 6, the performance of the lookup table matches the TF full accuracy CNN model.

Figure 7A:
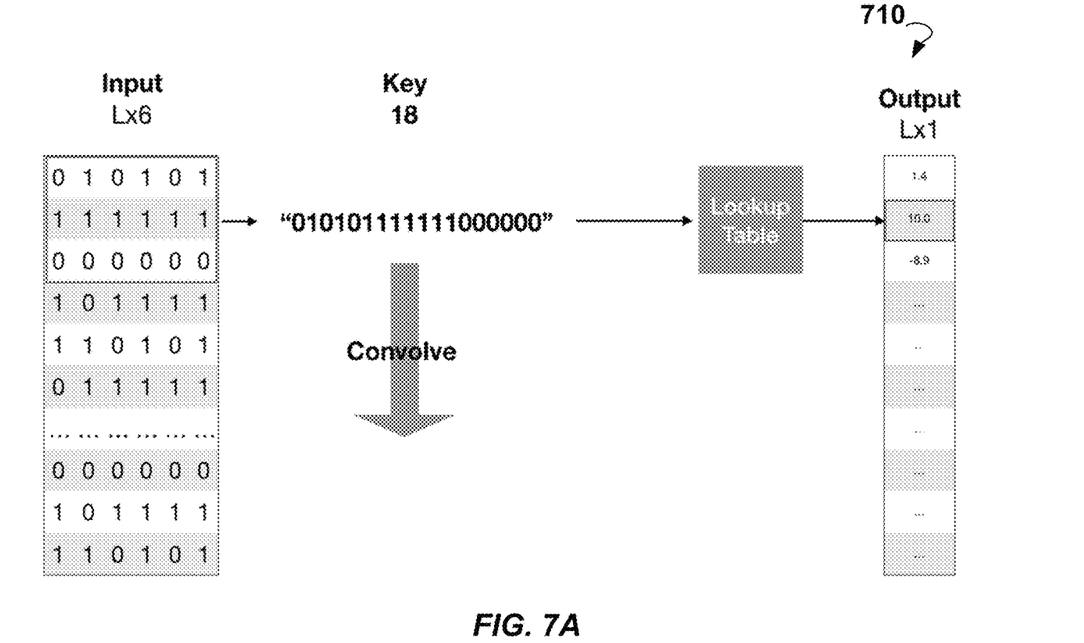
FIG. 7A is a schematic diagram showing an original lookup table setup process.

FIG. 7A is a schematic diagram showing an original lookup table 710. In the original lookup table 710, the corrupted copies of a network packet are provided in columns and values of bits at the same positions in the corrupted copies are provided in rows. Typically, 10 rounds of retransmission are needed for most communication systems. R rounds of NPP with kernel size 3 require a $2^{\{3R\}}$ lookup table, which is exponential with respect to the number of rounds, which makes using the lookup table not scalable to a large number of retransmission rounds.

To support more rounds of the NPP, an additive lookup table is provided. An additive property is assumed, which means the soft information of a+b-th round equals the sum of soft information of the first a rounds, and soft information of next consecutive b rounds (i.e., from round a+1 to round a+b) or, more formally, it is assumed that:

$$f(R\_(1,\ldots),R\_M)=f(R\_1,\ldots,R\_i)+f(R\_(i+1), R\_M), \text{ for } i\in\{2,\ldots,M-1\}$$

Figure 7B:
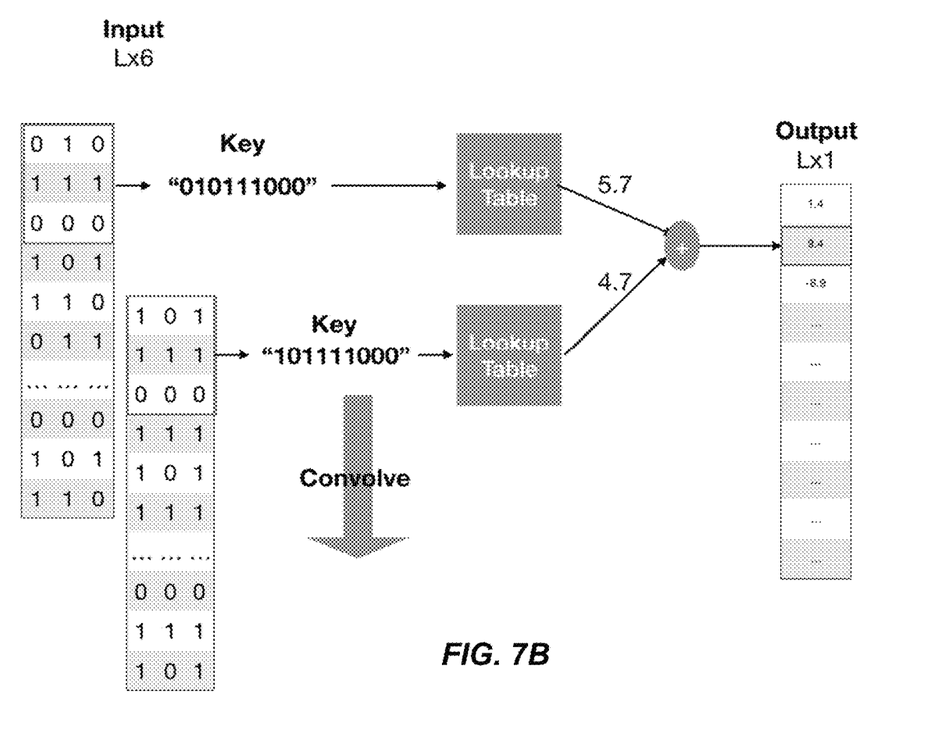
FIG. 7B illustrates a potential size reduction of the look-up table for a high number of rounds.

This is a very crude assumption that allows computing a large number of rounds by composing multiple results just from round 2 and 3, as shown in FIG. 7B for R=6, according to an example embodiment. Taking the original lookup table can result in 2^18 table size, which is intractable. Using two 3-round lookup tables, the soft information can be computed without exponentially increasing the size of the lookup table. The detailed combination of look-up table calls is as follows: Round 2: one 2-round look-up table call on rounds (1,2); Round 3: one 3-round look-up table call on rounds (1,2,3); Round 4: two 2-round look-up table calls on rounds (1,2) and (3,4), then add; Round 5: one 3-round look-up table call on rounds (1,2,3) and one 2-round look-up table call on rounds (4,5), then add; Round 6: two 3-round look-up table calls on rounds (1,2,3) and (4,5,6), then add; Round 7: one 3-round look-up table call on rounds (1,2,3) and two 2-round look-up table calls on rounds (4,5) and (6,7), then add; Round 8: two 3-round look-up table call on rounds (1,2,3) and (4,5,6), and one 2-round look-up table call on rounds (7,8), then add; Round 9: three 3-round look-up table calls on rounds (1,2,3) and (4,5,6) and (7,8,9), then add; Round 10: two 3-round look-up table call on rounds (1,2,3) and (4,5,6), and two 2-round look-up table calls on rounds (7,8) and (9, 10), and so forth.

Figure 8:
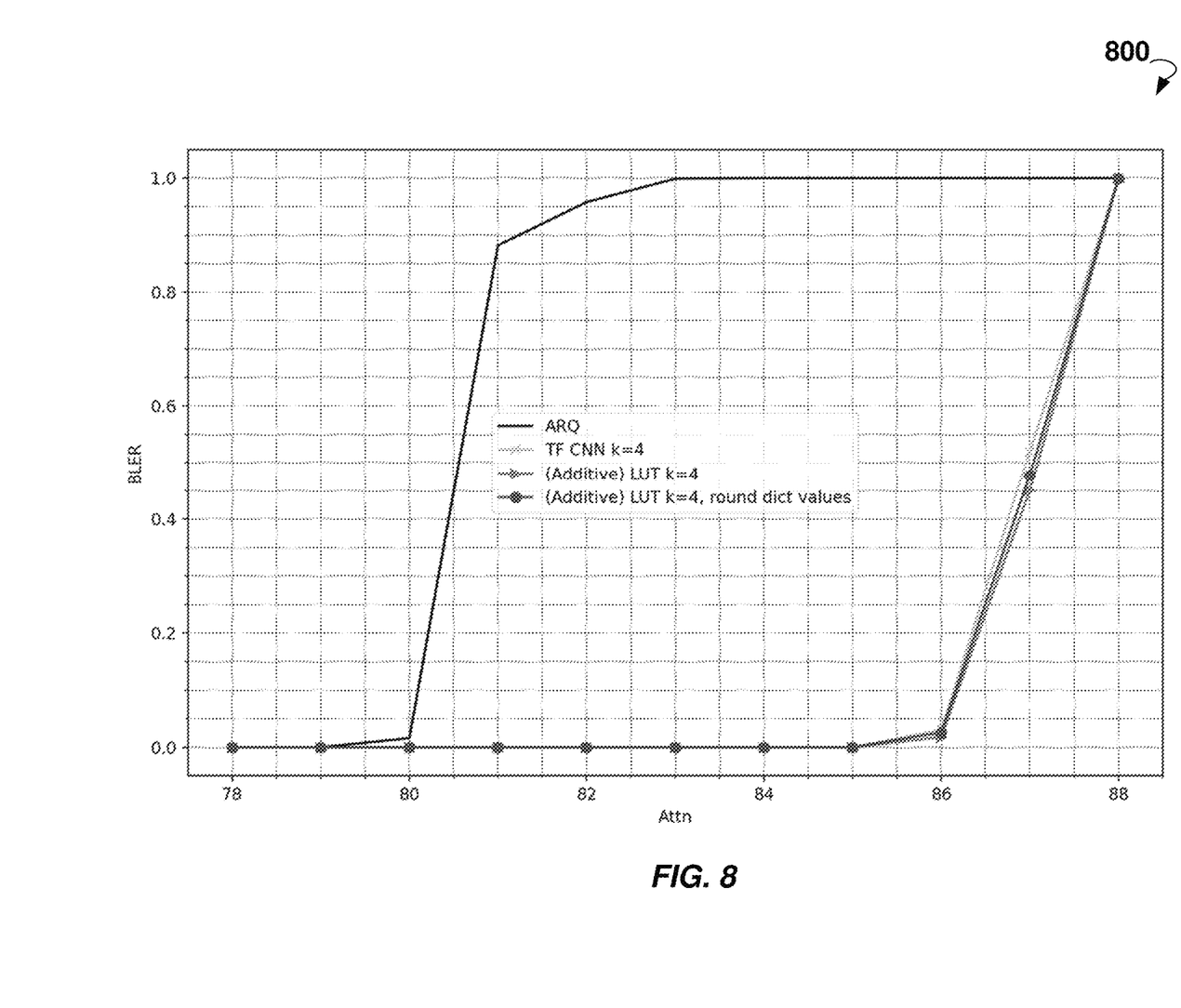
FIG. 8 is a diagram showing performance of the lookup table for ten rounds, according to an example embodiment.

FIG. 8 is a diagram 800 showing performance of the lookup table for 10 rounds. Although the assumption described with reference to FIGS. 7A and B may be too strong, the result in FIG. 8 shows that the additive lookup table works and shows the NPP implemented by CNN, which indicates that using the additive lookup table shows a minimal performance loss. In return, the additive lookup table uses a minimal memory, enabling the CNN model to run on microcontrollers with a large number of rounds.

The solution number 1, set forth above, describes keeping track of the number of rounds so it comes up with the proper combination of look-up table calls as mentioned, as well as buffering all the previously received packets up to the round R, which would require sizable memory storage. It would require a memory space of size R*L which increases linearly with R.

Also, the number of required calls for the lookup table increases as R grows. For example, for R=6, we have 2 calls to the lookup table, while for R=10 we would have 4 calls.

A second yet related solution would be a "Round Agnostic" approach: At any given round R, we have access to the accumulated soft information in the past that is stored in a buffer, and then compute the soft info (i.e., via calling look-up table) only for the most recently received packets.

We are required to store only up to 3 previous rounds (R-2, R-1, R) so we call the look-up table on these most recently received rounds, then store the soft information at specific rounds to be used in the future.

An example configuration of an algorithm is provided for explanatory purposes: Set the buffer initially as 0:

The buffer is actually an array of length L (same length as the original packet received) which stores the most recent soft information for all the packet bits. Let's set all the initial soft information values at 0.

b) At any round R>1, compute the soft information:
  If R=3*k (R mod 3=0):
    Call the 3-round look up table on rounds R-2, R-1, R as LUT(R-2, R-1, R)
    Soft information=buffer+LUT(R-2, R-1, R)
    Update the buffer as: buffer=buffer+LUT(R-2, R-1, R)
  If R=3*k+1 (R mod 3=1):
    Call the 3-round look up table on rounds R-2, R-1, R as LUT(R-2, R-1, R)
    Soft information=buffer+LUT(R-2, R-1, R)
  If R=3*k+2 (R mod 3=2):
    Call a 2-round look up table on rounds R-1, R as LUT(R-1, R)
    Soft information=buffer+LUT(R-1, R)

Note that the buffer is only updated at the rounds that are multiples of 3 (i.e. R=3, 6, 9, etc.) to be used at the future calls. We also can see that at any given round R, we need to store at most three recent rounds R-2, R-1, and R, which would require a memory space of only 3*L.

Also note that the additive logic from 2b still carries over to here as well, i.e. the soft information is still actually computed in an additive fashion. The performance of the round-agnostic Look-up Table shows minimal performance loss, with significant improvement on memory space reduction.

One of the challenges to tackle while implementing NPP on a microcontroller is that the look-up table cannot have an indefinitely high numerical precision, as it would take up too much memory and require too much computational power to do the downstream operations on it if we store the soft information look-up table as, say, float numbers.

Therefore, to enable implementing the lookup table in a microcontroller, which only supports int8 type, rather than float type, the performance difference between original float value and integer values, which is rounded to adjacent integers, is investigated. The performance of rounded values and float values is the same, as shown in FIG. 8, see rounded dict (dictionary) values. Therefore, the memory used by the lookup table can be further reduced. Table 2 shows the NPP performance, which enables the NPP to run on Bluetooth microcontrollers.

TABLE 2

| NPP execution performance | | |
|---|---|---|
| | Runtime for 1 packet | Model Size |
| NPP Lookup Table | <350 us | <8 KB |
| BT Requirement | <1 ms | <10 KB |

Based on the output of the NPP lookup table, it can be seen that, for any i-th bit position where the observed bit is equal across all the received rounds (for example, the bit number 10 is equal to 0 on all the received sequences), the NPP simply returns that observed value with high confidence. In other words, the NPP is actually only needed at the bit positions where the received bits across the rounds are not equal. This means that there definitely is an error at that particular position on one or more of the receptions.

Some embodiments can involve skipping NPP calls in the case of equal bits/bytes. Given this observation, whenever all the received bits are equal at a particular position i, the observed value with high confidence can be quickly returned and the next bit is then analyzed.

Furthermore, a plurality of bits can be compared, e.g., full bytes, across the rounds together. For example, the entire 10th received byte can be compared across all the rounds. If the bits are fully equal together, the entire byte can be returned as an error-free byte confidently and then the next byte is processed. The lookup table can be called and scanned with the moving window only when the bytes are not fully equal to each other, which means that there are reception errors within that byte, which need to be resolved with using the NPP. This approach saves a lot of time for the NPP on the microcontroller especially when the number of the total errors (i.e., the number of unequal bits) is not too large.

Figure 9:
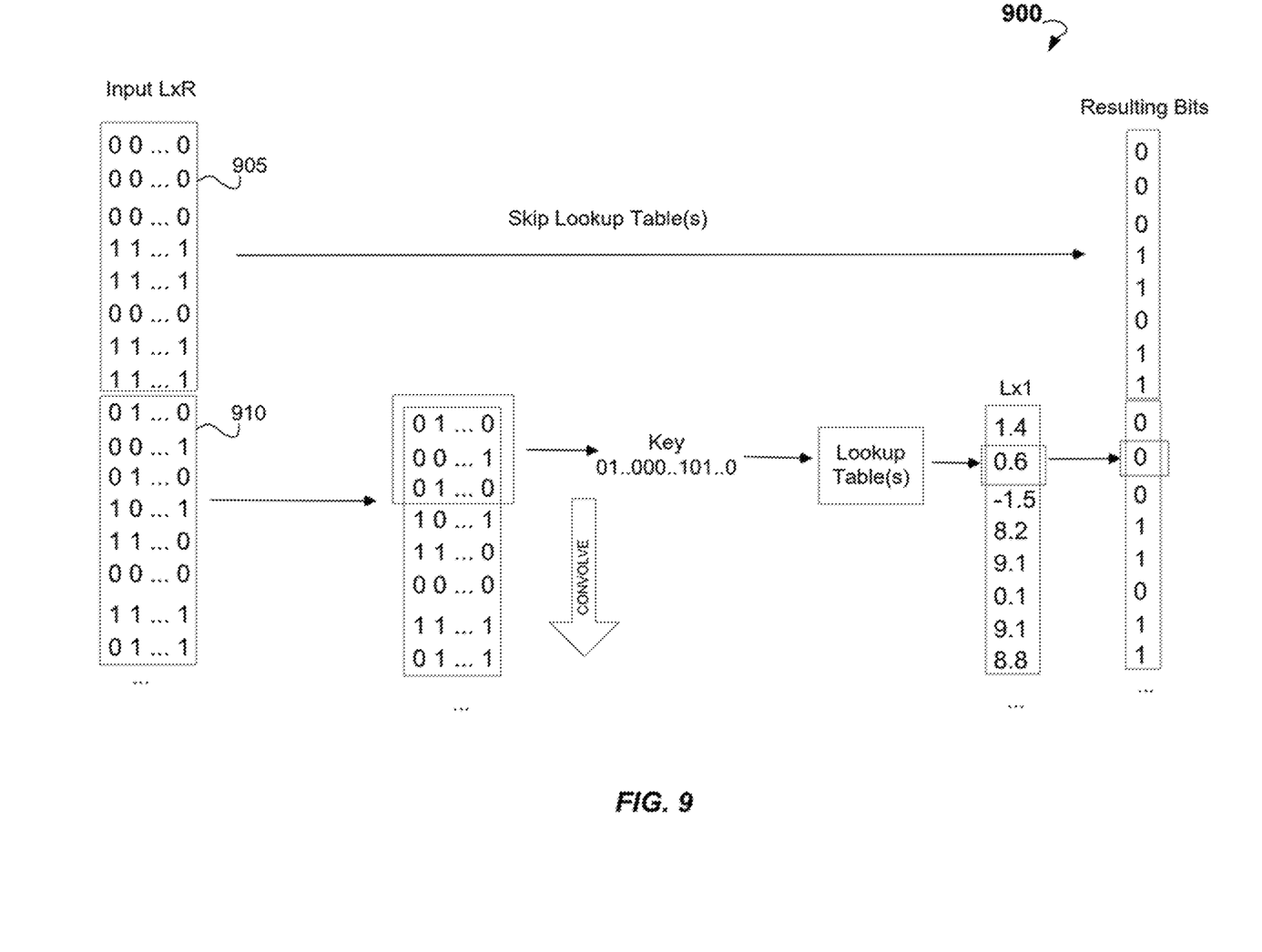
FIG. 9 is a schematic diagram illustrating 8-bit (1-byte) block comparison and intra-block window scan, according to an example embodiment.
Figure 10:
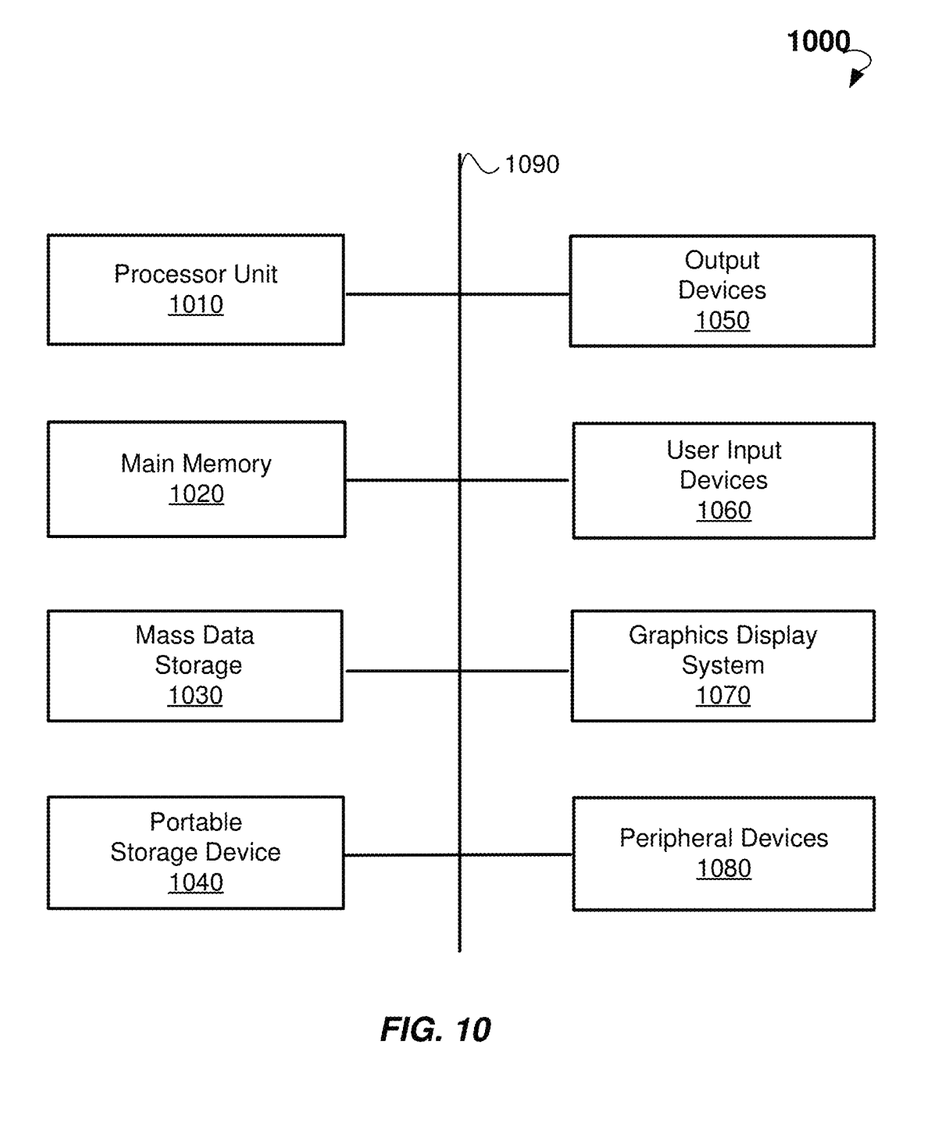
FIG. 10 shows a computing system that can be used to implement a system and a method for error correction in network packets, according to an example embodiment.

FIG. 9 is a schematic diagram 900 illustrating 8-bit (1-byte) block comparison and intra-block window scan to improve runtime performance. As shown in FIG. 9, copies of packets can be read byte by byte. If the byte is identical in all copies of a packet (see block 905), no lookup table is needed. If the byte is not identical (see block 910), certain bits and uncertain bits are found using the lookup tables as described with reference to FIG. 5. FIG. 10 illustrates an exemplary computer system 1000 that may be used to implement some embodiments of the present invention. The computer system 1000 of FIG. 10 may be implemented in the contexts of the likes of computing systems, networks, servers, or combinations thereof. The computer system 1000 of FIG. 10 includes one or more processor units 1010 and main memory 1020. Main memory 1020 stores, in part, instructions and data for execution by processor units 1010. Main memory 1020 stores the executable code when in operation, in this example. The computer system 1000 of FIG. 10 further includes a mass data storage 1030, portable storage device 1040, output devices 1050, user input devices 1060, a graphics display system 1070, and peripheral devices 1080.

The components shown in FIG. 10 are depicted as being connected via a single bus 1090. The components may be connected through one or more data transport means. Processor unit 1010 and main memory 1020 is connected via a local microprocessor bus, and the mass data storage 1030, peripheral device(s) 1080, portable storage device 1040, and graphics display system 1070 are connected via one or more input/output (I/O) buses.

Mass data storage 1030, which can be implemented with a magnetic disk drive, solid state drive, or an optical disk drive, is a non-volatile storage device for storing data and instructions for use by processor unit 1010. Mass data storage 1030 stores the system software for implementing embodiments of the present disclosure for purposes of loading that software into main memory 1020.

Portable storage device 1040 operates in conjunction with a portable non-volatile storage medium, such as a flash drive, floppy disk, compact disk, digital video disc, or Universal Serial Bus (USB) storage device, to input and output data and code to and from the computer system 1000 of FIG. 10. The system software for implementing embodiments of the present disclosure is stored on such a portable medium and input to the computer system 1000 via the portable storage device 1040.

User input devices 1060 can provide a portion of a user interface. User input devices 1060 may include one or more microphones, an alphanumeric keypad, such as a keyboard, for inputting alphanumeric and other information, or a pointing device, such as a mouse, a trackball, stylus, or cursor direction keys. User input devices 1060 can also include a touchscreen. Additionally, the computer system 1000 as shown in FIG. 10 includes output devices 1050. Suitable output devices 1050 include speakers, printers, network interfaces, and monitors.

Graphics display system 1070 includes a liquid crystal display (LCD) or other suitable display device. Graphics display system 1070 is configurable to receive textual and graphical information and processes the information for output to the display device. Peripheral devices 1080 may include any type of computer support device to add additional functionality to the computer system. The components provided in the computer system 1000 of FIG. 10 are those typically found in computer systems that may be suitable for use with embodiments of the present disclosure and are intended to represent a broad category of such computer components that are well known in the art. Thus, the computer system 1000 of FIG. 10 can be a personal computer (PC), handheld computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, and other suitable operating systems.

The processing for various embodiments may be implemented in software that is cloud-based. In some embodiments, the computer system 1000 is implemented as a cloud-based computing environment, such as a virtual machine operating within a computing cloud. In other embodiments, the computer system 1000 may itself include a cloud-based computing environment, where the functionalities of the computer system 1000 are executed in a distributed fashion. Thus, the computer system 1000, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computer system 1000, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user. The present technology is described above with reference to example embodiments. Therefore, other variations upon the example embodiments are intended to be covered by the present disclosure.

What is claimed is:
1. A system comprising:
   a processor; and
   a memory for storing instructions, the processor executing the instructions to:

receive copies of a network packet;
extract soft information from the copies of the network packet;
use the soft information to select K positions in a payload of the network packet with uncertain values of bits;
select the K positions having largest levels of uncertainty;
change the uncertain values at the K positions to selected combination of values to obtain a modified payload of the network packet; and
calculate an error detection code for the modified payload, wherein when the modified payload matches the error detection code in the network packet, errors in the payload are corrected.

2. The system according to claim 1, wherein the soft information may include expected values for bits in positions of the payload of the network packet.

3. The system according to claim 2, wherein extracting soft information includes obtaining the expected values using a machine learning model.

4. The system according to claim 3, wherein the machine learning model evaluates values of bits at position j in all the copies of the network packet and values of bits in positions neighboring to j in the copies of the network packet.

5. The system according to claim 4, further comprising determining levels of uncertainty for the positions of bits in the payload, wherein a level of uncertainty for the position j can be found as minimum between a distance of an expected value at the position j from 0 and a distance of the expected value at the position j from 1.

6. The system according to claim 5, further comprising selecting a combination of values of K bits from $2^K$ possible combinations of values of bits at selected K positions.

7. The system according to claim 6, wherein when the modified payload does not match the error detection code in the network packet, the processor is further configured to determine that all possible combinations of values of K bits have been selected and tested, and selecting a next combination when all the possible combinations have not been selected and tested.

8. The system according to claim 7, further comprising requesting that the network packet be retransmitted when the network packet cannot be corrected.

* * * * *